United States Patent [19]
Das et al.

[11] Patent Number: 5,464,897
[45] Date of Patent: Nov. 7, 1995

[54] AQUEOUS FLUOROPOLYMER DISPERSIONS

[75] Inventors: Suryya K. Das, Pittsburgh; Soner Kilic, Gibsonia, both of Pa.

[73] Assignee: PPG Industries, Inc., Pittsburgh, Pa.

[21] Appl. No.: 280,027

[22] Filed: Jul. 25, 1994

Related U.S. Application Data

[63] Continuation-in-part of Ser. No. 814,657, Dec. 30, 1991, abandoned.

[51] Int. Cl.$^6$ ........................................... C08F 2/16
[52] U.S. Cl. ............................... 524/458; 524/460
[58] Field of Search ........................ 524/458, 460

[56] References Cited

U.S. PATENT DOCUMENTS

| | | | |
|---|---|---|---|
| 4,064,087 | 12/1977 | Das | 260/29.6 RB |
| 4,151,143 | 4/1979 | Blank et al. | 524/533 |
| 4,276,432 | 6/1981 | Rhum et al. | 560/190 |
| 4,345,057 | 8/1982 | Yamabe et al. | 526/247 |
| 4,501,868 | 2/1985 | Bouboulis et al. | 526/208 |
| 4,656,237 | 4/1987 | Weber, Jr. | 526/320 |
| 4,687,822 | 8/1987 | Eguchi et al. | 526/205 |
| 4,711,944 | 12/1987 | Sherwin et al. | 526/318.42 |
| 4,758,642 | 7/1988 | Yezrielev et al. | 526/213 |
| 4,777,230 | 10/1988 | Kamath | 526/86 |
| 4,855,369 | 8/1989 | Yezrielev et al. | 526/320 |
| 4,985,517 | 1/1991 | Yezrielev et al. | 526/208 |
| 5,037,913 | 8/1991 | Leussler et al. | 526/201 |
| 5,057,312 | 10/1991 | Langla et al. | 424/61 |

FOREIGN PATENT DOCUMENTS

| | | |
|---|---|---|
| 099647 | 2/1984 | European Pat. Off. . |
| 103146 | 3/1984 | European Pat. Off. . |
| 103199 | 3/1984 | European Pat. Off. . |
| 158161 | 10/1985 | European Pat. Off. . |
| 197460 | 10/1986 | European Pat. Off. . |
| 206072 | 12/1986 | European Pat. Off. . |
| 275051 | 7/1988 | European Pat. Off. . |
| 320156 | 6/1989 | European Pat. Off. . |
| 341716 | 11/1989 | European Pat. Off. . |
| 2450785 | 5/1976 | Germany . |
| 47-8621 | 3/1972 | Japan . |
| 55-106267 | 8/1980 | Japan . |
| 57-42706 | 3/1982 | Japan . |
| 57-162708 | 10/1982 | Japan . |
| 58-13662 | 1/1983 | Japan . |
| 59-1776 | 1/1984 | Japan . |
| 59-64614 | 4/1984 | Japan . |
| 61-247705 | 11/1986 | Japan . |
| 859297 | 1/1961 | United Kingdom . |
| 1145564 | 3/1969 | United Kingdom . |
| 2169911 | 7/1986 | United Kingdom . |
| 2196973 | 5/1988 | United Kingdom . |
| 2201683 | 9/1988 | United Kingdom . |
| 90/00570 | 1/1990 | WIPO . |

*Primary Examiner*—Peter D. Mulcahy
*Attorney, Agent, or Firm*—Linda Pingitore; Dennis G. Millman

[57] ABSTRACT

A stable, aqueous fluorocopolymer dispersion prepared by aqueous dispersion polymerization of a) a dispersed phase containing a fluoroolefin monomer component and a vinyl ether monomer component in the presence of b) a base neutralized, stable aqueous dispersion of a polymeric dispersant having an acid value of at least 1.5 mg KOH/gram not exceeding about 35 mg KOH/gram and the amount of neutralizing base does not exceed about 10 percent based on resin solids of the dispersant. The acid value is adapted to provide a stable dispersion of the fluorocopolymer in water without externally added surfactant.

Thermoplastic and thermosetting coating compositions can be prepared from these aqueous fluorocopolymer dispersions.

24 Claims, No Drawings

AQUEOUS FLUOROPOLYMER DISPERSIONS

CROSS REFERENCE TO RELATED APPLICATIONS

This application is a continuation-in-part of U.S. Ser. No. 07/814,657 filed Dec. 30, 1991 now abandoned entitled Aqueous Fluoropolymer Dispersions.

This application is related to allowed Ser. No. 08/013,139 filed Feb. 3, 1993 now U.S. Pat. No. 5,342,878 entitled Base Neutralized, Stable Aqueous Dispersion of a Hydroxyl Functional Acrylic Polymer and Coating Compositions Prepared Therefrom, which is a continuation-in-part of Ser. No. 07/814,658, filed Dec. 30, 1991, now abandoned entitled Waterborne Acrylic Polymer, abandoned.

BACKGROUND OF THE INVENTION

The present application relates to aqueous fluoropolymer dispersions.

Fluoropolymers, that is, fluorine containing homo and copolymers of fluoroolefins such as tetrafluoroethylene, trichlorofluoroethylene and vinylidene fluoride are especially desirable in formulating coating compositions having exceptionally high requirements of durability, weatherability, mar resistance, general appearance, as well as chemical, ultraviolet and thermal stability. Such coatings, however, are typically thermoplastic coatings which require baking at elevated temperatures to permit coalescence of the fluoropolymer binder, since most of the commonly employed fluoropolymers are inherently crystalline materials and insoluble in most common organic solvents at ambient temperature. Thermosetting fluoropolymers, that is, fluoropolymers which contain functional groups capable of coreacting with conventionally utilized crosslinking agents such as aminoplasts or blocked isocyanates, are not as widely available nor frequently utilized. This is generally owing to the fact that olefinic fluoromonomers such as for example vinylidene fluoride do not readily copolymerize with other monomers which contain functional groups capable of imparting crosslinking capability to the resulting fluoropolymer. For example, fluoroolefin monomers do not readily copolymerize with acrylate monomers such as 2-hydroxyethyl acrylate in order to impart functional characteristics to the fluoropolymer.

Olefinic fluoromonomers such as chlorotrifluoroethylene, however, readily copolymerize with vinyl ethers. These vinyl ethers may or may not contain fluorine as a substituent. The copolymerization of an olefinic fluoromonomer with a functional vinyl ether such as hydroxybutyl vinyl ether to achieve a hydroxyl functional fluoropolymer capable of crosslinking with crosslinking agents as described above is a well known method of preparing thermosetting fluoropolymers. Yamabe et al U.S. Pat. No. 4,345,057 assigned to Asahi Glass Co. is directed to such a curable fluoropolymer. When prepared as an aqueous dispersion, however, for instance in working example 7 of the patent, conventional fluorosurfactant, ammonium perfluorononanoate, is utilized to stabilize the dispersion. Such fluorosurfactants typically have low surface energy, adhering well to fluoropolymers and facilitating stabilization of the dispersion. However, the fluorosurfactants generally do not contain functional groups which can participate in crosslinking, therefore, films prepared from the resulting fluoropolymers have less than optimum physical properties such as diminished humidity resistance. Using conventional surfactants such as the ammonium salt of ethoxylated nonyl phenol sulfate in place of the fluorosurfactants has further drawbacks. These materials tend to have high surface energy, not adhering well to fluoropolymers and resulting in less than optimum conversion of monomers to polymer as well as instability of the fluoropolymer dispersion.

In a similar vein, European patent application 341,716 describes the preparation of an aqueous fluoropolymer dispersion wherein fluorosurfactant is utilized as a dispersant and polyethylene glycol monovinyl ether is a comonomer.

European patent application 0 320 156 discloses an aqueous based fluoropolymer wherein the fluoropolymer is dispersed in water as an amine carboxylate and acts as dispersant while acrylic polymer is prepared as a dispersed phase. In order to make the aqueous fluoropolymer dispersant, hydroxyl functional fluoropolymer is reacted with anhydride to generate the half acid ester for neutralization to an amine carboxylate for dilution with water.

The ability to prepare thermosetting aqueous fluoropolymer dispersions with a surface active agent which does not contain fluorine and is capable of crosslinking in a thermosetting system, rather than with conventional surfactants or fluorosurfactants is desirable.

SUMMARY OF THE INVENTION

In accordance with the present invention there is provided a stable, aqueous fluorocopolymer dispersion synthesized by aqueous dispersion polymerization of a) monomers comprising a fluoroolefin monomer component and a vinyl ether monomer component in the presence of b) a base neutralized, stable aqueous dispersion of a polymeric dispersant having an acid value of at least 1.5 mg KOH/gram and not exceeding about 35 mg KOH/gram and a number average molecular weight ranging from about 500 to about 250,000, the amount of neutralizing base not exceeding about 10 percent based on resin solids of the polymeric dispersant, the acid value adapted to provide a stable dispersion of the fluorocopolymer in water without externally added surfactant.

A preferred fluorocopolymer dispersion is prepared by aqueous dispersion polymerization of (a), above, in the presence of a base neutralized, stable aqueous dispersion of a hydroxyl functional acrylic polymer as dispersant.

Also provided herein are coating compositions prepared from the aforedescribed stable aqueous fluorocopolymer dispersion.

DETAILED DESCRIPTION OF THE INVENTION

The stable, aqueous fluorocopolymer dispersion of the present invention generally can be prepared by aqueous dispersion polymerization of a dispersed phase of monomers in the presence of a neutralized aqueous polymer as dispersant. The dispersed phase of monomers contains a fluoroolefin monomer component and a vinyl ether monomer component. The fluoroolefin monomer component can be a single fluoroolefin or a mixture of fluoroolefin monomers. Fluoroolefin monomers having 2 or 3 carbon atoms are preferred with the perhaloolefins being particularly preferred, that is fluoroolefins in which all of the hydrogen atoms of the olefin have been substituted with fluorine atoms and optionally other halogen atoms. Examples of suitable fluoroolefins include fluoroethylenes such as tetrafluoroethylene, trifluoroethylene, difluoroethylene, fluoroethylene, chlorotrifluoroethylene, dichlorodifluoroethylene, dichlorofluoroethylene, chlorofluoroethylene and trichlorofluoroethylene; and fluoropropylenes such as heptafluoropropylene, hexafluoropropylene, tetrafluoropropylene and trifluoropropylene. Of the materials listed above, tetrafluoroethylene, chlorotrifluoroethylene and hexafluoropropylene are preferred for use herein. Chlorotrifluoroethylene is particularly preferred.

The vinyl ether monomer component can be a single vinyl ether monomer or a mixture of monomers. The vinyl ether monomer component can contain nonfunctional as well as functional monomers. Examples of nonfunctional monomers include alkyl and aryl vinyl ethers or fluoro substituted derivatives thereof such as ethyl vinyl ether, n-propyl vinyl ether, n-butyl vinyl ether and phenyl vinyl ether. Also vinyl esters such as vinyl acetate and allyl or fluoroallyl ethers such as tetrafluoroallyl ether can be utilized. As used herein, a functional vinyl ether monomer is one which contains functional groups such as hydroxyl, alkyloxy silyl, carboxyl or amino which are capable of coreacting with curing agents which contain groups coreactive with these functional groups.

A stable, aqueous fluorocopolymer dispersion synthesized from a vinyl ether component which is essentially free of functional vinyl ether monomers is particularly suitable for the preparation of thermoplastic coating compositions which are capable of drying and coalescence without externally added crosslinking materials.

For many applications, however, it is particularly desirable to have an aqueous fluorocopolymer dispersion which is capable of providing a thermosetting coating composition. That is, a coating composition which is cured to a crosslinked state with the use of externally added crosslinking agents such as aminoplasts or polyisocyanate curing agents. In order to prepare such an aqueous fluorocopolymer dispersion, the vinyl ether component should contain at least a portion of a functional vinyl ether monomer or mixture of monomers which are copolymerizable with fluoroolefin monomers. Examples of such vinyl ethers include hydroxyalkyl vinyl ethers such as 2-hydroxyethyl vinyl ether, 3-hydroxy (n)butyl vinyl ether, 4-hydroxy (n)butyl vinyl ether, 3-hydroxy (n)propyl vinyl ether, 5-hydroxy (n)pentyl vinyl ether and 6-hydroxy (n)hexyl vinyl ether. Also suitable are 2,3-dihydroxypropyl vinyl ether, 3-hydroxy-2,2-dimethylpropyl vinyl ether, 2-methyl-2-hydroxymethyl-3-hydroxypropyl vinyl ether, 2-ethyl-2-hydroxymethyl-3-hydroxypropyl vinyl ether and 2,2-bis(hydroxymethyl)-3-hydroxypropyl vinyl ether. A preferred functional vinyl ether monomer is 4-hydroxy(n)butyl vinyl ether.

It should be noted that the vinyl ether monomer component can also contain a fluorine substituted vinyl ether monomer.

The continuous phase contains water and the polymeric dispersant which is described more fully below. The dispersed phase contains the monomers to be polymerized as well as the polymerization initiator when it is oil soluble. However, for water soluble initiators, these are usually present in the continuous phase. For aqueous dispersion polymerization, a variety of free radical polymerization initiators can be used. For example, inorganic water soluble initiators such as persulfates such as ammonium persulfate; potassium persulfate; hydrogen peroxide; and redox initiators such as a combination of said compounds with a reducing agent such as isoascorbic acid, sodium hydrogen sulfite or sodium thiosulfate, and a mixture of these compounds with a small amount of ferrous salt or silver nitrate. Organic, water soluble initiators are also suitable, for example, dibasic acid peroxides such as disuccinic acid peroxide, diglutaric acid peroxide and monosuccinic acid peroxide as well as azobis (isobutyramidine) dibasic acid salts. Oil soluble initiators such as peroxy ester type peroxides, for example, tertiarybutyl peroxy isobutyrate, tertiarybutyl perbenzoate, benzoyl peroxide, and azo initiators such as 2,2'-azobis(2-methylbutane nitrile) and azobis (isobutyronitrile) can also be used. Also suitable is 4,4'-azobis(4-cyanopentanoic acid) which can be made water soluble by neutralization with an appropriate base.

The amount of polymerization initiator can vary widely and is selected depending upon the specific polymerization conditions. Usually the amount of polymerization initiator is within the range of from about 0.01 to about 10 weight percent, preferably from about 0.01 to about 5 weight percent based on the total amount of monomers used in the copolymerization.

The mole ratio of fluoroolefin monomer component to vinyl ether monomer component in the dispersed phase is 1 to 1.

The polymerization can be conducted as a batch, semi-continuous or continuous polymerization. The temperature of the polymerization is generally within the range of about 35° C. to about 100° C., with the optimum temperature being selected depending upon the particular polymerization initiator; the fluoroolefin and vinyl ether monomer components. Preferably, the temperature ranges from about 45° C. to about 80° C. The reaction is typically conducted in a high pressure reactor. Although not necessary, if desired, chain transfer agents such as mercaptans or halogenated organic compounds can be utilized.

The aqueous polymeric dispersant which is utilized in preparation of the aqueous fluorocopolymer dispersion can be selected from a wide group of materials including cationic, anionic and non-ionic materials. The dispersant generally contains functional groups which permit the material to be dispersed in an aqueous medium in its neutralized form. For example, carboxylic acid groups would be base neutralized such as with an amine containing material whereas basic functional groups such as amine would be neutralized with an acid containing material. Preferably, the dispersant is an anionic polyelectrolyte polymer containing carboxyl groups which are base neutralized. Such a preferred polymeric dispersant has an acid value of at least about 1.5 mg KOH/gram of polymer and not exceeding about 35 mg KOH/gram of polymer, preferably ranging from about 1.5 mg KOH/gram to about 32 mg KOH/gram and more preferably from about 1.5 to about 10 mg KOH/gram of polymer. The amount of neutralizing base generally does not exceed about 10 percent based on the resin solids of the polymeric dispersant, and preferably does not exceed about 5 percent based on resin solids.

Examples of suitable aqueous polymeric dispersants include base neutralized carboxyl functional polyacrylates, also referred to herein as acrylic polymers, base neutralized carboxyl functional polyurethanes, base neutralized carboxyl functional polyesters, acid neutralized sulfonium epoxy materials and acid neutralized sulfonium acrylic materials. Also suitable are polyoxyalkene containing materials such as the PLURONIC® polyols commercially available from BASF, e.g. PLURONIC F-68 which is a block copolymer of ethylene oxide and propylene oxide. Base neutralized acrylic polymers also containing hydroxyl groups are preferred as aqueous polymeric dispersants for the preparation of the claimed aqueous fluorocopolymer dispersion and are described in detail below. One skilled in the art readily appreciates the manner of preparation for all of the aqueous polymeric dispersants listed above. However, should further details be desired, reference is made to the following: "Recent Developments in the Synthesis and End Uses of Waterborne Polymers" by J. L. Gardon in Proceedings of the Fifth Waterborne and High Solids Coatings Symposium, Jan. 30–Feb. 1, 1978, New Orleans, La., Volume 1, page 134, 1978; "Recent Developments in Water-based Coatings", by R. M. Christenson in Proceedings of the Sixth Waterborne and High Solids Coatings Symposium, Feb. 12–14, 1979, New Orleans, La., Volume 1, page 82, 1979; and "Crosslinking: Chemistry of Surface Coatings" by S. Paul in Comprehensive Polymer Science: The Synthesis, Characterization, Reactions and Applications of Polymers, Edited by G. C. Eastmond, A. Ledwith, S. Russo, and P. Sigwalt, Pergamon Press, New York, Volume 6, page 149, 1989.

The preferred hydroxyl functional acrylic polymer dispersant is prepared by the solution polymerization in organic solvent of a vinyl monomer component. The dispersant can be rich in acid functionality and relatively low in hydroxyl functionality or relatively low in acid functionality and hydroxyl rich, so long as it has sufficient acid value to permit dispersion into water. Generally, the hydroxyl functional acrylic polymer has an acid value within the ranges detailed above which is adapted to provide a stable dispersion of the fluorocopolymer in water without externally added surfactant. In a preferred embodiment the dispersant is hydroxyl rich and low in acid functionality which is introduced as a result of carboxyl group containing residues present in the vinyl monomer component such as for example acid residues associated with 2-hydroxyethyl acrylate. Such a hydroxyl functional acrylic polymer preferably contains less than 1 percent acid and has an acid value of from about 1.5 to about 10 mg KOH/gram of polymer. Neutralization of this preferred dispersant can be accomplished with much less base e.g. amine, than is typically required for neutralization of polymeric materials which contain acid functionality from the incorporation of acid functional monomers. As has been mentioned above the amount of neutralizing base generally does not exceed 10 percent, preferably not exceeding 5 percent based on the resin solids of the polymeric dispersant. This quality is particularly advantageous in the free radical polymerization of fluoroolefins. Fluoroolefins readily undergo dehydrohalogenation in aqueous basic environments which in turn often leads to poor conversion of monomers to polymer resulting in lower yields of fluorocopolymer. Moreover, discoloration frequently occurs in basic aqueous environments, it is believed, because of polyene formation due to dehydrohalogenation. Therefore, the utilization of a dispersant in the polymerization process which contains minimal residual base results in an aqueous fluorocopolymer dispersion which exhibits minimal to no dehydrohalogenation and discoloration. Details of this preferred dispersant can be found in allowed U.S. patent application Ser. No. 08/013,139, filed Feb. 3, 1993, entitled Base Neutralized, Stable Aqueous Dispersion of a Hydroxyl Functional Acrylic Polymer and Coating Compositions Prepared Therefrom, which is a continuation-in-part of Ser. No. 07/814,658, abandoned, which is incorporated by reference herein.

Typically, acid functionality is introduced from vinyl monomers which contain carboxylic acid groups such as acrylic acid or methacrylic acid or sulfonic acid groups such as sulfoethyl methacrylate or 2-acrylamido-2-methyl propane sulfonic acid sold under the registered trademark AMPS® by Lubrizol Corp. Preferably, as mentioned above, the vinyl monomer component also contains a portion of hydroxyl functional vinyl monomer. This is quite advantageous in the preparation of a thermosetting coating composition wherein hydroxyl groups present on the dispersant as well as on the fluorocopolymer are both capable of engaging in crosslinking reaction with curing agent to form a thermoset cured film. As was mentioned above, the dispersant is prepared in organic solvent followed by neutralization with base such as, for example, a volatile amine, water is added followed by the removal of organic solvent by azetropic distillation. Examples of suitable bases for neutralization of the acid groups prior to dispersion into water include N,N-dimethylethanolamine, 2-amino-2-methyl-1-propanol, N-ethylmorpholine, triethylamine and ammonia. Examples of suitable organic solvents for the solution polymerization include aromatic hydrocarbons such as xylene and toluene, alcohols such as n-butanol and isopropanol; esters such as butyl acetate; ketones such as methyl isobutyl ketone and glycol ethers such as propylene glycol monoethyl ether.

In addition to acrylic and methacrylic acid, suitable acid functional vinyl monomers include monoesters of unsaturated dicarboxylic acids such as maleic acid, fumaric acid and itaconic acid, for example, mono(hydroxyethyl) and mono-(hydroxypropyl) esters of maleic acid. The balance of the vinyl monomer component can include a variety of other vinyl monomers which contain polymerizable vinyl unsaturation. Hydroxyl functional vinyl monomers include, for example, 2-hydroxyethyl acrylate, 2-hydroxyethyl methacrylate, 2-hydroxypropyl acrylate, 2-hydroxypropyl methacrylate and 2-hydroxybutyl methacrylate. Also useful are acrylamide; N-methylolacrylamide and N-alkoxymethyl acrylamides such as N-ethoxymethyl acrylamide and N-butoxymethyl acrylamide; tertiarybutylaminoethyl methacrylate. Also suitable are alkyl acrylates and methacrylates which contain from 1 to 18 carbon atoms in the alkyl portion such as methyl (meth) acrylate, ethyl (meth) acrylate, propyl (meth) acrylate, n-butyl (meth)acrylate, pentyl (meth) acrylate, hexyl (meth)acrylate, heptyl (meth) acrylate, 2-ethylhexyl (meth) acrylate, lauryl (meth) acrylate, stearyl (meth) acrylate, isodecyl (meth) acrylate and isobornyl (meth)acrylate. Styrene, para-methyl styrene, alpha-methyl styrene, acrylonitrile, methacrylonitrile and vinyl esters such as vinyl acetate or vinyl versatare can also be used. Mixtures of the aforesaid monomers can also be utilized.

The amount of hydroxyl functional vinyl monomer usually ranges from about 10 percent to about 60 percent. A preferred hydroxyl functional acrylic polymer dispersant is prepared from a vinyl monomer component comprising at least about 50 percent of 2-hydroxyethyl acrylate and at least one other comonomer, the percentages based in the total weight of the vinyl monomer component, neutralized with an amount of base not exceeding 5 percent based on the resin solids of the dispersant. Preferably, the vinyl comonomer is n-butyl methacrylate at a level of about 50 percent and the amount of 2-hydroxyethyl acrylate is about 50 percent. This preferred polymer corresponds to the preferred acid value range of from about 1.5 to about 10 mg KOH/gram of polymer mentioned above.

Generally, the aqueous polymeric dispersant has a number average molecular weight ranging from about 500 to about 250,000, preferably from about 500 to about 50,000 more preferably from about 500 to about 10,000 and most preferably from about 1000 to about 4500 as determined by gel permeation chromatography (GPC) using polystyrene as a standard.

Aqueous fluorocopolymer dispersions in accordance with the present invention prepared in the presence of a base neutralized stable aqueous dispersion of a polymeric dispersant exhibit good stability and excellent conversion of monomers to polymer compared to fluorocopolymer dispersions prepared in the presence of conventional surfactants. Conversion of monomers to polymer of greater than 80 percent is generally obtained with conversions between 85 and 90 percent more typically obtained.

The aqueous fluorocopolymer dispersion of the present invention is particularly advantageous in formulating both thermoplastic and thermosetting coating compositions for a variety of coating applications. A thermoplastic coating composition typically contains the aqueous fluorocopolymer dispersion as well as other conventional additives such as thickeners, defoamers, fillers, ultraviolet light stabilizers and pigments. The thermoplastic coating compositions are typically dried and coalesced by baking at a temperature from about 25° C. to about 150° C. for a period of from 24 hours to 10 minutes, respectively.

The thermoserring coating compositions according to the present invention are prepared by combining an aqueous fluorocopolymer dispersion as has been detailed above which contains functional groups such as hydroxyl introduced from the vinyl ether component as well as preferably from the aqueous polymeric dispersant. The aqueous fluorocopolymer dispersion is cocured with a crosslinking agent capable of reacting with the functional groups. Examples of such materials include aminoplasts, phenoplasts as well as blocked and unblocked polyisocyanate curing agents. These materials are very well known to and understood by those skilled in the are of coating compositions therefore further description will not be included herein. If additional information is desired, reference is made to U.S. Pat. No. 4,822,685 which is incorporated by reference herein. The additives mentioned above can also be present.

Coating compositions according to the present invention have excellent hardness, flexibility, chemical resistance, stain resistance and weathering resistance. They are particularly effective as coatings for precoated metal as well as for other substrates such as glass, concrete and plastics. They are especially advantageous as topcoats over fluoropolymer based primers and/or basecoats.

The following examples are illustrative of the invention and are not intended to be limiting.

DISPERSANT PREPARATION

The following examples show the synthesis of various aqueous dispersants used in the preparation of aqueous dispersions of fluoropolymers.

EXAMPLE 1

The following initial charge and feeds were used in the preparation of aqueous acrylic dispersant.

| Ingredients | Parts by Weight |
|---|---|
| Initial Charge | |
| Xylene | 630.0 |
| Feed A | |
| tert-Butyl perbenzoate | 120.0 |
| 2-Hydroxyethyl acrylate | 1200.0 |
| n-Butyl methacrylate | 1200.0 |
| Feed B | |

| Ingredients | Parts by Weight |
|---|---|
| N,N-Dimethylethanolamine | 123.8 |
| Feed C | |
| Deionized water | 6114.3 |

The initial charge was heated to reflux temperature (141° C.) with agitation in a reaction vessel suitable for azeotropic distillation. Feed A was added in a substantially continuous manner over a period of 3 hours while maintaining the reaction mixture at reflux temperature. At the completion of Feed A the reaction mixture was held for 2 hours at 141° C. to complete the polymerization. The resultant acrylic polymer had a total solids of 82.9 percent determined at 110° C. for one hour and number average molecular weight of 2381 as determined by gel permeation chromatography (GPC) using polystyrene as a standard. The reaction mixture was cooled to 106° C. and Feed B was added over 10 minutes. The reaction mixture was heated to azeotropic distillation temperature after adding Feed C over 20 minutes. After azeotropic distillation of xylene the product was cooled and filtered to yield an aqueous dispersion free from xylene with a resin content of 29.1 percent and pH of 8.7.

EXAMPLE 2

The following example shows the preparation of an acrylic dispersant by using polymerizable alpha,beta-ethylenically unsaturated acid comonomer.

| Ingredients | Parts by Weight |
|---|---|
| Initial Charge | |
| Isopropanol | 250.0 |
| Feed A | |
| Isopropanol | 216.7 |
| 2-Hydroxyethyl acrylate | 245.0 |
| n-Butyl methacrylate | 427.0 |
| Acrylic acid | 28.0 |
| VAZO-67[1] | 35.0 |
| Feed B | |
| N,N-Dimethylethanolamine | 35.0 |
| Feed C | |
| Deionized water | 2100.0 |
| Feed D | |
| Deionized water | 2250.0 |

[1] 2,2'-Azobis(2-methylbutanenitrile), available from E. I. Du Pont de Nemours & Company The initial charge was heated with agitation to reflux temperature (83° C.) in a reaction vessel suitable for azeotropic distillation under atmospheric pressure. Feed A was added continuously over a period of 3 hours while maintaining the reaction mixture at reflux temperature. At the completion of Feed A, the reaction mixture was held for 3 hours at 84°–86° C. to complete the polymerization. Finally, the reaction mixture was cooled to room temperature. The resultant acrylic polymer had a total solids content of 58.9 percent determined at 110° C. for one hour and number average molecular weight of 5835 as determined by GPC using polystyrene as a standard. After adding Feeds B and C, the reaction mixture was heated to reflux temperature for distillation of isopropanol-water azeotropic mixture. The distillation of isopropanol-water mixture was continued to reach constant reflux temperature of 99° C. Feed D was added in portions during distillation of isopropanol-water mixture. Finally, the reaction mixture was allowed to cool to room temperature. The resultant aqueous dispersion of acrylic polymer was free from isopropanol, had a total solids content of 28.1 percent determined at 110° C. for one hour and pH of 8.5.

EXAMPLE 3

The following example shows the preparation of an acrylic dispersant in a manner similar to that of Example 2 but in which the percent of 2-hydroxyethyl acrylate monomer was reduced and Feeds B and C were added as a single feed. The following initial charge and feeds were used in the preparation.

| Ingredients | Parts by Weight |
|---|---|
| Initial Charge | |
| Isopropanol | 650.6 |
| Feed A | |
| Isopropanol | 564.0 |
| 2-Hydroxyethyl acrylate | 364.4 |
| n-Butyl methacrylate | 1384.5 |
| Acrylic acid | 72.9 |
| VAZO-67 | 91.1 |
| Feed B | |
| N,N-Dimethylethanolamine | 91.0 |
| Deionized water | 5465.4 |
| Feed C | |
| Deionized water | 3921.5 |

The initial charge was heated with agitation to reflux temperature in a reaction vessel suitable for azeotropic distillation under atmospheric pressure. Feed A was added continuously over a period of 3 hours while maintaining the reaction mixture at reflux temperature. At the completion of Feed A, the reaction mixture was held for 3 hours at 84° C. to complete the polymerization. Finally, the reaction mixture was cooled to room temperature. The resultant acrylic polymer had a total solids content of 60.4 percent determined at 110° C. for one hour and number average molecular weight of 6633 as determined by GPC using polystyrene as a standard. The reaction mixture was heated to 30° C. for Feed B addition. Then the reaction mixture was heated further to reflux temperature for distillation of isopropanol-water azeotropic mixture. The distillation of isopropanol-water mixture was continued to reach constant reflux temperature of 99° C. The reaction product was held 2.5 hours at 99° C. The total amount of distillane collected was 3205.7 grams. Feed D was added in portions during distillation of isopropanol-water mixture. Finally, the reaction mixture was cooled to room temperature and filtered to yield an aqueous dispersion with a resin content of 19.5 percent determined at 110° C. for one hour and pH of 8.1. The isopropanol content of the final dispersion was 0.01 percent. The pH of the dispersion was adjusted to 9.0 by adding 54.5 grams of N,N-dimethylethanolamine.

EXAMPLE 4

The following example shows the preparation of an acrylic dispersant in a manner similar to that of Example 2 but in which n-butyl methacrylate in Feed A was replaced with a mixture of n-butyl acrylate and methyl methacrylate and Feeds B and C were added as a single feed. The following initial charge and feeds were used in the preparation.

| Ingredients | Parts by Weight |
|---|---|
| Initial Charge | |
| Isopropanol | 650.6 |
| Feed A | |
| Isopropanol | 564.0 |
| 2-Hydroxyethyl acrylate | 364.4 |
| n-Butyl acrylate | 692.3 |
| Methyl methacrylate | 692.3 |
| Acrylic acid | 72.9 |
| VAZO-67 | 91.1 |
| Feed B | |
| N,N-Dimethylethanolamine | 91.0 |
| Deionized water | 5465.4 |
| Feed C | |
| Deionized water | 3801.2 |

The initial charge was heated with agitation to reflux temperature in a reaction vessel suitable for azeotropic distillation under atmospheric pressure. Feed A was added continuously over a period of 3 hours while maintaining the reaction mixture at reflux temperature. At the completion of Feed A, the reaction mixture was held for 3 hours at 84° C. to complete the polymerization. Finally, the reaction mixture was cooled to room temperature. The resultant acrylic polymer had a total solids content of 60.4 percent determined at 110° C. for one hour and number average molecular weight of 4753 as determined by GPC using polystyrene as a standard. The reaction mixture was heated to 35° C. for Feed B addition. Then the reaction mixture was heated further to reflux temperature for distillation of isopropanol-water azeotropic mixture. The distillation of isopropanol-water mixture was continued to reach constant reflux temperature of 99° C. The reaction product was held 2 hours at 99° C. The total amount of distillate collected was 3194.0 grams. Feed D was added in portions during distillation of isopropanol-water mixture. Finally, the reaction mixture was cooled to room temperature and filtered to yield an aqueous dispersion with a resin content of 19.8 percent determined at 110° C. for one hour and pH of 8.1. The isopropanol content of the final dispersion was 0.01 percent. The pH of the dispersion was adjusted to 8.7 by adding 33.0 grams of N,N-dimethylethanolamine.

EXAMPLE 5

The following initial charge and feeds were used in the preparation of solventless polyurethane.

| Ingredients | Parts by Weight |
| --- | --- |
| Initial Charge | |
| FORMREZ 66-112[1] | 1827.00 |
| Dimethylol propionic acid | 151.50 |
| TMXDI[2] | 1189.50 |
| Feed A | |
| Dibutyltin dilaurate | 1.25 |

[1]Saturated hydroxyl terminated linear polyester with OH number = 112, available from Witco Chemical Corporation.
[2]Tetramethylxylylene diisocyanate, available from American Cyanamid Co.

The initial charge was introduced under nitrogen blanket into a reaction vessel suitable for polyurethane preparation. The initial charge was heated to 70° C. and Feed A was added. The reaction mixture was heated to 80° C. and the temperature was maintained at 80° C. until a constant NCO equivalent weight was reached (theoretical NCO equivalent weight was 826 g).

The prepared polyurethane was dispersed into aqueous medium as follows:

| Ingredients | Parts by Weight |
| --- | --- |
| Initial Charge | |
| Deionized water | 2383.50 |
| N,N-Dimethylethanolamine | 35.95 |
| Foamkill 649[1] | 0.20 |
| Feed A | |
| Prepolymer from above | 1100.00 |
| Feed B | |
| Deionized Water | 37.50 |
| Dytek A[2] | 37.48 |
| Feed C | |
| Deionized Water | 35.50 |
| Ethanol amine | 35.45 |

[1]Proprietary blend of petroleum hydrocarbon, available from Crucible Chemical Company.
[2]2-Methylpentamethylene diamine (95% active), available from E. I. Du Pont de Nemours & Company.

The initial charge was introduced under nitrogen blanket into a reaction vessel suitable for preparation aqueous dispersion of polyurethane. The addition of Feed A to the reaction mixture was initiated at room temperature with agitation and continued over a period of 3 minutes. At the completion of Feed A, the temperature was reached to 33° C. Feed B was added dropwise into reaction mixture over 8 minutes period. At the completion of Feed B, the reaction temperature reached to 36° C. After holding the reaction mixture at about 10 minutes at this temperature, Feed C was added dropwise over 10 minutes period. At the completion of Feed C the reaction mixture was held for 4 hours to complete chain extension reaction. The reaction mixture was filtered through 50 micron filter bag. The resultant aqueous polyurethane dispersion had a total solids content of 31.7 percent determined at 110° C. for one hour, number average molecular weight of 8709 as determined by GPC using polystyrene as a standard, particle size 483 Angstrom and pH of 8.49.

EXAMPLE 6

This example was prepared in a manner similar to that of Example 4 but in which 62.1 g aqueous ammonium hydroxide (28 percent NH$_3$) was used to replace N,N-dimethylethanolamine in Feed B for neutralization of carboxyl groups. The final aqueous dispersion had a total solid content of 19.8 percent determined at 110° C. for one hour and a pH of 9.0.

DISPERSION PREPARATION

The following examples show the preparation of aqueous dispersions of fluorine containing polymers using the various polymeric dispersants described above.

EXAMPLE I

The following initial charge and feeds were used in the preparation of a fluorine containing non-functional dispersed phase in the presence of the aqueous dispersant of Example 1.

| Ingredients | Parts by Weight |
| --- | --- |
| Initial Charge | |
| Aqueous dispersant of Example 1 | 1422.0 |
| Deionized water | 909.0 |
| Butyl vinyl ether | 191.1 |
| VAZO-52[1] | 6.2 |
| Feed A | |
| Chlorotrifluoroethylene | 222.6 |

[1]2,2'-Azobis(2,4-Dimethylpentanenitrile), available from E. I. Du Pont de Nemours & Company.

The initial charge was introduced into a stainless steel reaction vessel suitable for running reactions under high pressure. The reactor and the initial charge were deoxygenated by purging with nitrogen and vacuum and was kept at a negative pressure (−0.94 kg/cm$^2$) to add Feed A over 5 minutes. Then the reaction mixture was heated to 65° C. when a pressure rise to 6.37 kg/cm$^2$ was observed. The reaction mixture was maintained at this temperature for 7 hours when the pressure dropped to 0.85 kg/cm$^2$. The reaction mixture was cooled to room temperature and the product was discharged by nitrogen pressure. The dispersion was azeotropically distilled to free it from unreacted volatile monomers. The stable aqueous fluoropolymer dispersion had a total solids content of 28.6 percent determined at 110° C. for one hour. The conversion of monomers to polymer was about 89 percent.

EXAMPLE II

The following example shows the preparation of an aqueous dispersion of a fluorine containing dispersed phase in a manner similar to that of Example I but in which the dispersed phase contained hydroxyl functional monomer. The following initial charge and feeds were used to prepare the aqueous dispersion.

| Ingredients | Parts by Weight |
|---|---|
| *Initial Charge* | |
| Aqueous dispersant of Example 2 | 1031.0 |
| Deionized water | 1181.7 |
| Butyl vinyl ether | 120.3 |
| Hydroxybutyl vinyl ether | 139.6 |
| VAZO-67 | 8.1 |
| *Feed A* | |
| Chlorotrifluoroethylene | 280.2 |

The initial charge was introduced into a stainless steel reaction vessel suitable for running reactions under high pressure. The reactor and the initial charge were deoxygenated by purging with nitrogen and vacuum and was kept at a negative pressure ($-0.71$ kg/cm$^2$) to add Feed A over 15 minutes. Then the reaction mixture was heated to 65° C. when a pressure rise to 8,15 kg/cm$^2$ was observed, The reaction mixture was maintained at this temperature for 5 hours when the pressure dropped to 1.14 kg/cm$^2$. The reaction mixture was cooled to room temperature and the product was discharged by nitrogen pressure. The dispersion was azeotropically distilled to free it from unreacted volatile monomers. The stable aqueous fluoropolymer dispersion had a total solids content of 28.0 percent determined at 110° C. for one hour. The conversion of monomers to polymer was about 88 percent.

EXAMPLE III

The following example shows the preparation of an aqueous dispersion of a fluorine containing dispersed phase in a manner similar to that of Example II but in which the monomers were added into the reactor continuously, The following charge and feeds were used to prepare the aqueous dispersion.

| Ingredients | Parts by Weight |
|---|---|
| *Initial Charge* | |
| Aqueous dispersant of Example 3 | 1485.6 |
| Deionized water | 706.0 |
| *Feed A* | |
| Butyl vinyl ether | 192.8 |
| Hydroxybutyl vinyl ether | 55.8 |
| VAZO-67 | 7.9 |
| *Feed B* | |
| Chlorotrifluoroethylene | 280.2 |

The initial charge was introduced into a stainless steel reaction vessel suitable for running reactions under high pressure. The reactor and the initial charge were deoxygenated by purging with nitrogen and vacuum and was kept at a negative pressure ($-0.85$ kg/cm$^2$), Then the initial charge was heated to 65° C. Feeds A and B were initiated simultaneously and continued in a substantially continuous manner over a period of 3 hours while maintaining the reaction temperature at 65° C. The maximum observed pressure was 4.15 kg/cm$^2$. At the completion of addition of Feeds A and B the reaction mixture was held 3 hours at this temperature when the pressure dropped to 0.48 kg/cm$^2$. The reaction mixture was cooled to room temperature and the product was discharged by nitrogen pressure. The dispersion was azeotropically distilled to free it from unreacted volatile monomers. The stable aqueous fluoropolymer dispersion had a total solids content of 28.4 percent determined at 110° C. for one hour. The conversion of monomers to polymer was about 90 percent.

EXAMPLE IV

The following example shows the preparation of an aqueous dispersion of a fluorine containing dispersed phase in a manner similar to that of Example III but in which the aqueous dispersant of Example 4 was used. The following initial charge and feeds were used to prepare the aqueous dispersion.

| Ingredients | Parts by Weight |
|---|---|
| *Initial Charge* | |
| Aqueous dispersant of Example 4[1] | 1463.1 |
| Deionized water | 728.5 |
| *Feed A* | |
| Butyl vinyl ether | 192.8 |
| Hydroxybutyl vinyl ether | 55.8 |
| VAZO-67 | 7.9 |
| *Feed B* | |
| Chlorotrifluoroethylene | 280.2 |

[1]The pH was adjusted to 9.0 by using N,N-dimethylethanolamine.

The maximum observed pressure was 3.04 kg/cm$^2$. At the completion of addition of Feeds A and B the reaction mixture was held 3 hours at this temperature when the pressure dropped to 0.75 kg/cm$^2$. The dispersion was azeotropically distilled to free it from unreacted volatile monomers. The stable aqueous fluoropolymer dispersion had a total solids content of 28.0 percent determined at 110° C. for one hour. The conversion of monomer to polymer was about 88 percent.

EXAMPLE V

The following example shows the preparation of an aqueous dispersion of a fluorine containing dispersed phase in a manner similar to that of Example III but in which the aqueous dispersant of Example 5 was used. The following initial charge and feeds were used to prepare the aqueous dispersion.

| Ingredients | Parts by Weight |
|---|---|
| *Initial Charge* | |
| Aqueous dispersant of Example 5 | 913.9 |
| Deionized water | 1277.7 |
| *Feed A* | |
| Butyl vinyl ether | 192.8 |
| Hydroxybutyl vinyl ether | 55.8 |
| VAZO-67 | 7.9 |
| *Feed B* | |
| Chlorotrifluoroethylene | 280.2 |

The maximum observed pressure was 5.36 kg/cm$^2$. At the completion of addition of Feeds A and B the reaction mixture was held 3 hours at this temperature when the pressure dropped to 0.74 kg/cm$^2$. The dispersion was azeotropically distilled to free it from unreacted volatile monomers. The stable aqueous fluoropolymer dispersion had a total solids content of 28.1 percent determined at 110° C. for one hour. The conversion of monomers to polymer was about 89 percent.

EXAMPLE VI

The following example shows the preparation of an aqueous dispersion of a fluorocopolymer using ammonium persulfate as a water soluble initiator in the presence of the aqueous dispersant of Example 6.

| Ingredients | Parts by Weight |
|---|---|
| Initial Charge | |
| Aqueous dispersant of Example 6 | 1463.1 |
| Deionized water | 734.1 |
| Ammonium persulfate | 2.6 |
| Butyl vinyl ether | 19.4 |
| Hydroxybutyl vinyl ether | 5.6 |
| Feed A | |
| Chlorotrifluoroethylene | 28.0 |
| Feed B | |
| Butyl vinyl ether | 173.4 |
| Hydroxybutyl vinyl ether | 50.2 |
| Feed C | |
| Chlorotrifluoroethylene | 252.2 |

The initial charge was introduced into a stainless steel reaction vessel suitable for running reactions under high pressure. The reactor and the initial charge were deoxygenated by purging with nitrogen and vacuum and were kept at a negative pressure ($-0.80$ kg/cm$^2$). Then the initial charge was heated to 65° C. prior to the addition of Feed A over 8 minutes. After holding the reaction mixture 15 minutes at this temperature, Feeds B and C were initiated simultaneously and continued in a substantially continuous manner over a period of 3 hours while maintaining the reaction temperature at 65° C. The maximum observed pressure was 2.27 kg/cm$^2$. At the completion of addition of Feeds B and C the reaction mixture was held 3 hours at this temperature when the pressure dropped to 0.39 kg/cm$^2$. The reaction mixture was cooled to room temperature and the product was discharged by nitrogen pressure. The dispersion was azeotropically distilled to free it from unreacted volatile monomers. The stable aqueous fluorocopolymer dispersion had a total solids content of 28.2 percent determined at 110° C. for one hour. The conversion of monomers to polymer was about 90 percent.

EXAMPLE VII

The following initial charge and feeds were used in the preparation of a hydroxyl functional fluorocopolymer in the presence of aqueous dispersion of Example 1.

| Ingredients | Parts by Weight |
|---|---|
| Initial Charge | |
| Aqueous dispersant of Example 1 | 995.5 |
| Deionized water | 1217.2 |
| Hydroxybutyl vinyl ether | 139.8 |
| Butyl vinyl ether | 120.0 |

| Ingredients | Parts by Weight |
|---|---|
| VAZO-52 | 8.1 |
| Feed A | |
| Chlorotrifluoroethylene | 280.2 |

The initial charge was introduced into a stainless steel reaction vessel suitable for running reactions under high pressure. The reactor and the initial charge were deoxygenated by purging with nitrogen and vacuum and were kept at a negative pressure ($-0.92$ kg/cm$^2$) to add Feed A over 10 minutes. Then the reaction mixture was heated to 65° C. when a pressure rise to 7.78 kg/cm$^2$ was observed. The reaction mixture was maintained at this temperature for 6 hours when the pressure dropped to 1.50 kg/cm$^2$. The reaction mixture was cooled to room temperature and the product was discharged by nitrogen pressure. The dispersion was azeotropically distilled to free it from unreacted volatile monomers. The stable aqueous fluorocopolymer dispersion had a total solids content of 27.3 percent determined at 110° C. for one hour. The conversion of monomers to polymer was about 84 percent.

EXAMPLE VIII

COATING PREPARATION

In this example a clear coating formulated with an aqueous fluorocopolymer of the present invention was compared with a solventborne fluorocopolymer clearcoat prepared from a commercially available resin.

The following were mixed together to prepare a clear coating according to the invention.

| Ingredients | Parts by Weight | Relative Solids | Percent Relative Solids |
|---|---|---|---|
| Aqueous Dispersion of Example VII | 391.3 | 113.5 | 64.5 |
| CYMEL ® 303[1] | 61.6 | 61.6 | 35.0 |
| NACURE ® 2501-X[2] | 2.1 | 0.9 | 0.5 |

[1]Hexamethoxymethyl melamine, available from CYTEC Industries.
[2]Amine blocked aromatic sulfonic acid in isopropanol, methanol and water mixture (43% active), available from King Industries, Inc.

| Ingredients | Parts by Weight | Relative Solids | Percent Relative Solids |
|---|---|---|---|
| LUMIFLON ®-200[1] | 307.2 | 184.3 | 89.5 |
| CYMEL ® 303 | 20.6 | 20.6 | 10.0 |
| CYCAT 4040[2] | 2.1 | 1.0 | 0.5 |

[1]Hydroxyl functional fluoropolymer in xylene (60 percent solid), available from ICI.
[2]Solution of p-toluene sulfonic acid in isopropanol (40% active), available from CYTEC Industries.

Reducer: Xylene/Butanol (50/50 by weight)
Spray Viscosity: 24" #2 Zahn cup
Cure Schedule: 10 minutes at 300° F. (149° C.)
Flash Time: 10 minutes
Dry Film Thickness: 1.0 mil The above coating was applied, flashed and cured as indicated on aluminum panels primed as follows.

Primer: DURANAR® FLASH PRIMER commercially available from PPG Industries, Inc. as UC51742
  Reducer: Methyl isobutyl ketone
  Spray Viscosity: 19" #2 Zahn cup
  Cure Schedule: 10 minutes at 475° F. (246° C.)
  Flash Time: 5 minutes
  Dry Film Thickness: 0.3 mils
  The cured panels were evaluated for each of the following tests. The results are tabulated in Table 1.

TESTS

GLOSS: Measured in accordance with the latest issue of ASTM D 523 using a 60° gloss meter.

PENCIL HARDNESS: Using a Berol Eagle Turquoise pencil, having a full diameter of lead exposed to the length of ¼" minimum to ⅜" maximum, the end of the lead was flattened 90 degrees to the pencil axis using fine-grit sand or emery paper. Holding the pencil at 45° to the film surface, it was pushed forward about ¼" using as much downward pressure as could be applied without breaking the lead. Reference ASTM D 3363.

METHYL ETHYL KETONE (MEK) RESISTANCE: The coated surface of each test piece was rubbed forcefully with a piece of cloth saturated with MEK under the pressure of fingers in 100 reciprocations. The results were evaluated in terms of the state of surface dissolution, injury and degree of swelling and rated as pass (P) or fail (F).

ACID TEST: 10 drops of 10% (by volume) solution of muriatic acid (37% commercial grade hydrochloric acid) in tap water were applied to the panels and covered with a watch glass, convex side up, at room temperature. After 15 minute exposure, the acid was washed off with running tap water. No blistering, and visual change in appearance when examined by the unaided eye was rated as pass (P).

IMPACT RESISTANCE: Using a ⅝" diameter round-nosed impact tester (160 in.-lb. range), Gardner impact tester, a load (2 lbs.) was applied directly to the coated surface sufficient to deform the test sample a minimum of 0.10". Tape was applied by pressing down firmly against the coating to eliminate voids and air pockets and sharply pulled off at a right angle to the plane of the surface being tested. The test specimen temperature was between 65° and 80° F. (27° C.). The maximum height the weight dropped which did not cause removal of film to substrate was measured and the results were recorded in in.-lb (height×weight). For the reverse impact test the load was applied to the uncoated side of the specimen.

CROSSHATCH:

30 min boil: 11 parallel cuts were made on each test piece, ¹⁄₁₆" apart through the film, followed by 11 similar cuts at 90 degrees to and crossing the first 11 cuts. The samples were immersed in boiling deionized water for 30 minutes. The water remained boiling throughout the test. The samples were then removed and wiped dry. Within 5 minutes, at ambient temperature, tape was applied over the cuts by pressing down firmly against the coating to eliminate voids and air pockets. The tape was sharply pulled off at a right angle to the plane of the surface being tested. The films were rated for removal of film under the tape within or outside of the crosshatched area or blistering anywhere on the wet test specimen from 0 to 5, where 0 was the worst and 5 was the best.

REVERSE IMPACT:

30 min boil: The reverse impact test method mentioned above was applied to the test pieces after holding 30 minutes in boiling water as described above.

WATER SOAK: Cuts were made as outlined above in 30 min boil test. The samples were immersed in deionized water at 100° F. (38° C.) for 24 hours, removed and wiped dry. The tape test outlined above in the 30 min boil test was repeated within 5 minutes.

MORTAR TEST: Mortar was prepared by mixing 75 grams of building lime conforming to ASTM C 207 and 225 grams of dry sand, both passing through a 10-mesh wire screen with sufficient water, approximately 100 grams, to make a soft paste. Wet pats of mortar (about 2 square inches in area and ½" in thickness) were applied immediately to coated specimens which had been aged at least 24 hours after coating. Test sections were exposed immediately for 24 hours to 100% relative humidity at 100° F. To receive a pass rating (P), mortar should have been dislodged easily from the painted surface and any residue should have been removable with a damp cloth. Any lime residue should have been easily removed with the 10% muriatic acid solution described in acid test. There should have been no loss of film adhesion or visual change in appearance when examined by the unaided eye.

DETERGENT RESISTANCE: At least two test specimens were immersed in a 3% (by weight) solution of detergent and distilled water at 100° F. for 72 hours. The samples were removed and wiped dry. Tape was immediately applied by pressing down firmly against the coating to eliminate voids and air pockets, placing the tape longitudinally along the entire length of the test specimens. If blisters were visible, then the blistered area was taped, the tape sharply pulled off at a right angle to the plane of the surface being tested and the area rated. Detergent composition was as follows:

| TECHNICAL GRADE REAGENTS | % BY WEIGHT |
|---|---|
| Tetrasodium pyrophosphate | 45 |
| Sodium sulphate, anhydrous | 23 |
| Sodium alkylarylsulfonate[1] | 22 |
| Sodium metasilicate, hydrated | 8 |
| Sodium carbonate, anhydrous | 2 |

[1]Allied Chemical Co. Nacconal 90F

A pass (P) rating indicated no loss of adhesion of the film to the metal, no blistering and no significant visual change in appearance when examined by the unaided eye.

EXAMPLE IX

COMPARATIVE

In the following examples A and B, aqueous dispersions of fluorocopolymers were prepared using conventional dispersants.

A

The following example shows the preparation of an aqueous dispersion of a fluorocopolymer in a manner similar to that of Example III above but in which an aqueous dispersant prepared according to Example VIII from U.S. Pat. No. 4,064,087 was used.

| Ingredients | Parts by Weight |
|---|---|
| Initial Charge | |
| Aqueous dispersant of US 4,064,087[1] | 875.2 |
| Deionized water | 1316.4 |
| Feed A | |
| Butyl vinyl ether | 192.8 |
| Hydroxybutyl vinyl ether | 55.8 |
| VAZO-67 | 7.9 |
| Feed B | |
| Chlorotrifluoroethylene | 280.2 |

The initial charge was introduced into a stainless steel reaction vessel suitable for running reactions under high pressure. The reactor and the initial charge were deoxygenated by purging with nitrogen and vacuum and was kept at negative pressure (−0.79 kg/cm$^2$). Then the initial charge was heated to 65° C. Feeds A and B were initiated simultaneously and continued in a substantially continuous manner over a period of 3 hours while maintaining the reaction temperature at 65° C. The maximum observed pressure was 6.39 kg/cm$^2$. At the completion of the Feeds A and B the reaction mixture was held 3 hours at this temperature when the pressure dropped to 2.17 kg/cm$^2$. The reaction mixture was cooled to room temperature and the product was discharged by nitrogen pressure. The dispersion had a total solids content of 25.9 percent determined at 110° C. for one hour. The dispersion had some settlement with time and the total solids in the liquid phase dropped to 24.1 percent by weight in 24 hours. The conversion of monomers to polymer was about 78 percent.

[1]. The preparation was as follows:

To a reactor equipped with a stirrer, thermocouple, nitrogen inlet, dropping funnel and a condenser equipped with a water trap was charged 500.0 grams of ethylene glycol monoethylether. The contents of the reactor were heated to 132° C. over a period of about 15 minutes. Then 1428.0 grams of a feed mixture continuing 90.2 percent methyl methacrylate, 7.8 percent methacrylic acid, 1.0 percent 2,2'-azobis(2-methylbutane nitrile) and 1.0 percent tertiary dodecylmercaptan were added to the reaction mixture over a period of 3 hours. The reaction mixture was then held for an additional hour. Following this 25.0 grams of ethylene glycol monoethylether and 6.2 grams of tertiary butyl perbenzoate were added to the reaction mixture and the reaction mixture held for 1.5 hours. Then, 3.0 grams of hydroquinone were added to the reaction mixture. Following this addition, 46.2 grams of glycidyl methacrylate were added. Heating was continued for an additional 8 hours and the reaction mixture was then cooled to 117° C. At this time, 58.3 grams of dimethyl ethanolamine were added to the reaction mixture and then 2400 grams of deionized water at a temperature of 75° C. were added to the reaction mixture to achieve the desired viscosity. The resultant polymer salt dispersion product had the following properties:

| | |
|---|---|
| Total solids content at 150° C. | 33.1 percent by weight |
| Acid value | 14.9 |

The following example shows the preparation of an aqueous dispersion of a fluorocopolymer in a manner similar to that of Example III above but in which a conventional surfactant, ALIPAL® CO-436, was used as a dispersant.

| Ingredients | Parts by Weight |
|---|---|
| Initial Charge | |
| ALIPAL CO-436[1] | 111.7 |
| Deionized water | 1766.2 |
| Feed A | |
| Butyl vinyl ether | 295.3 |
| Hydroxybutyl vinyl ether | 85.5 |
| VAZO-67 | 12.2 |
| Feed B | |
| Chlorotrifluoroethylene | 429.2 |

[1]Ammonium salt of ethoxylated nonyl phenol sulfate (58.0% active), available from Rhone-Poulenc Inc.

The initial charge was introduced into a stainless steel reaction vessel suitable for running reactions under high pressure. The reactor and the initial charge were deoxygenated by purging with nitrogen and vacuum and was kept at negative pressure (−0.75 kg/cm$^2$). Then the initial charge was heated to 65° C. Feeds A and B were initiated simultaneously and continued in a substantially continuous manner over a period of 3 hours while maintaining the reaction temperature at 65° C. The pressure in the reactor was continuously built up during the feeding period. The pressure was 11.51 kg/cm$^2$ at the end of the feeding. At the completion of the Feeds A and B the reaction mixture was held about 1.5 hours at this temperature when the pressure raised to 11.62 kg/cm$^2$. The reaction temperature was raised to 75° C. and held about one hour at this temperature. The final pressure was 13.63 kg/cm$^2$. The reaction mixture was cooled to room temperature and the product was discharged by nitrogen pressure. The dispersion had a total solids content of 8.4 percent determined at 110° C. for one hour. The conversion of monomers to polymer was about 19 percent. The dispersion was milky in appearance and exhibited some yellow, oily settlement with time.

As can be seen from the preparations above, conversion of monomers to polymer in both instances was less than optimum. Also, both of the dispersions of Examples A and B were not stable since settlement occurred.

TABLE 1

| | Gloss | Pencil | MEK rubs | Acid | Impact Direct | Impact Reverse | 30 min Boil | Reverse Impact 30 min boil | Water Soak | Mortar | Detergent |
|---|---|---|---|---|---|---|---|---|---|---|---|
| Aqueous Dispersion of Invention | 92 | H | P | P | 40 | less than 20 | 5 | 5(−) | 5 | P | P |
| Solventborne Polymer (Comparative) | 79 | H | P | P | 20 | less than 20 | 0 | 0 | 0 | P | P |

What is claimed is:

1. A stable aqueous fluorocopolymer dispersion synthesized by aqueous dispersion polymerization of
   a) monomers comprising a fluoroolefin monomer component and a vinyl ether monomer component, in the presence of
   b) a base neutralized, stable aqueous dispersion of a hydroxyl functional polymeric dispersant having an acid value of at least about 1.5 mg KOH/gram of polymer and not exceeding about 35 mg KOH/gram of polymer and a number average molecular weight ranging from about 500 to about 250,000, the amount of neutralizing base not exceeding about 10 percent based on the resin solids of the polymeric dispersant, the acid value adapted to provide a stable dispersion of the fluorocopolymer in water without externally added surfactant.

2. The aqueous fluorocopolymer dispersion of claim 1 wherein the acid value of the polymeric dispersant ranges from about 1.5 to about 32 mg KOH/gram.

3. The stable aqueous fluorocopolymer dispersion of claim 1 wherein the number average molecular weight of the polymeric dispersant ranges from about 500 to about 50,000.

4. The aqueous fluorocopolymer dispersion of claim 1 wherein the amount of neutralizing base does not exceed about 5 percent based on resin solids of the polymeric dispersant.

5. The aqueous fluorocopolymer dispersion of claim 1 wherein the polymeric dispersant is a base neutralized hydroxyl functional acrylic polymer.

6. The aqueous fluorocopolymer dispersion of claim 5 wherein the base neutralized hydroxyl functional acrylic polymer has an acid value of from about 1.5 mg KOH/gram to about 10 mg KOH/gram.

7. The aqueous fluorocopolymer dispersion of claim 5 wherein the base neutralized hydroxyl functional acrylic polymer is prepared from a vinyl monomer component comprising from about 10 percent to about 60 percent of hydroxyl functional vinyl monomer.

8. The aqueous fluorocopolymer dispersion of claim 7 wherein the hydroxyl functional vinyl monomer is 2-hydroxyethyl acrylate.

9. A stable aqueous fluorocopolymer dispersion synthesized by aqueous dispersion polymerization of:
   (a) monomers comprising a fluorolefin monomer component and a vinyl ether monomer component in the presence of:
   b) a base neutralized, stable aqueous dispersion of a hydroxyl functional acrylic polymer having an acid value of at least about 1.5 mg KOH/gram of polymer and not exceeding about 10 mg KOH/gram of polymer and a number average molecular weight ranging from about 500 to about 250,000, synthesized from a vinyl monomer component comprising at least about 50 percent of 2-hydroxyethyl acrylate and at least one other comonomer, the percentages based on the total weight percent of the vinyl monomer component, the amount of neutralizing base not exceeding 10 percent based on the resin solids of the acrylic polymer, the proportion of each monomer and the acid value adapted to provide a stable dispersion of the fluorocopolymer in water without externally added surfactant.

10. The stable aqueous fluorocopolymer dispersion of claim 9 wherein the number average molecular weight of the acrylic polymer ranges from about 500 to about 50,000.

11. The stable aqueous fluorocopolymer dispersion of claim 9 wherein the number average molecular weight of the acrylic polymer ranges from about 500 to about 10,000.

12. The stable aqueous fluorocopolymer dispersion of claim 9 wherein the amount of neutralizing base does not exceed about 5 percent based on resin solids of the acrylic polymer.

13. The stable aqueous fluorocopolymer dispersion of claim 9 wherein the hydroxyl functional acrylic polymer contains less than 1 percent acid.

14. The stable aqueous dispersion of claim 9 wherein the vinyl monomer component is a mixture of about 50 percent 2-hydroxyethyl acrylate and about 50 percent n-butyl methacrylate, the percentage based on the total weight of the vinyl monomer component.

15. The aqueous fluorocopolymer dispersion of claim 9 wherein the vinyl ether monomer component contains functional vinyl ether monomers.

16. The aqueous fluorocopolymer dispersion of claim 9 wherein the vinyl ether monomer component contains a fluorine substituted vinyl ether monomer.

17. The aqueous fluorocopolymer dispersion of claim 15 wherein the functional vinyl ether monomer is hydroxybutyl vinyl ether.

18. The aqueous fluorocopolymer dispersion of claim 1 wherein the polymeric dispersant is a base neutralized carboxyl functional polyurethane.

19. The aqueous fluorocopolymer dispersion of claim 9 wherein the mole ratio of fluoroolefin to vinyl ether component is 1:1.

20. The aqueous fluorocopolymer dispersion of claim 9 wherein the fluoroolefin monomer component comprises chlorotrifluoroethylene.

21. The aqueous fluorocopolymer dispersion of claim 9 wherein the fluoroolefin monomer component comprises a mixture of chlorotrifluoroethylene, tetrafluoroethylene and hexafluoropropylene.

22. A coating composition comprising a stable, aqueous fluorocopolymer dispersion synthesized by aqueous dispersion polymerization of
   a) monomers comprising a fluoroolefin monomer component and a vinyl ether monomer component in the presence of
   b) a base neutralized, stable aqueous dispersion of a hydroxyl functional polymeric dispersant having an acid value of at least about 1.5 mg KOH/gram of polymer and not exceeding about 35 mg KOH/gram of polymer and a number average molecular weight ranging from about 500 to about 250,000, the amount of neutralizing base not exceeding 10 percent based on resin solids of the polymeric dispersant, the acid value adapted to provide a stable dispersion of the fluorocopolymer in water without externally added surfactant.

23. The coating composition of claim 22 wherein the polymeric dispersant is a base neutralized hydroxyl functional acrylic polymer and the vinyl ether monomer component comprises functional vinyl ether monomer.

24. The coating composition of claim 23 additionally comprising a crosslinking agent.

* * * * *